United States Patent [19]

Vassiliou

[11] Patent Number: 5,149,561
[45] Date of Patent: Sep. 22, 1992

[54] METHODS OF MAKING SIMULATED RAW EGGS

[76] Inventor: Eustathios Vassiliou, 12 S. Townview La., Newark, Del. 19711

[21] Appl. No.: 757,641

[22] Filed: Sep. 11, 1991

Related U.S. Application Data

[63] Continuation-in-part of Ser. No. 750,116, Aug. 26, 1991, which is a continuation-in-part of Ser. No. 551,160, Jul. 11, 1990, Pat. No. 5,073,399.

[51] Int. Cl.⁵ .............................................. A23L 1/32
[52] U.S. Cl. .................................... 426/614; 426/100; 426/273; 426/274; 426/279; 426/520
[58] Field of Search ............... 426/100, 273 274, 279, 426/520, 614

[56] References Cited

U.S. PATENT DOCUMENTS

| | | | |
|---|---|---|---|
| 3,510,315 | 5/1970 | Hawley | 99/113 |
| 3,640,732 | 2/1972 | Johnson | 99/114 |
| 3,843,825 | 10/1972 | Hawley | 426/393 |
| 3,911,144 | 10/1975 | Strong et al. | 426/588 |
| 3,941,892 | 3/1976 | Glasser et al. | 426/104 |
| 3,987,212 | 10/1976 | Seeley et al. | 426/614 |
| 4,046,922 | 9/1977 | Burkwall, Jr. | 426/104 |
| 4,103,038 | 7/1978 | Roberts | 426/601 |
| 4,103,040 | 7/1978 | Fioriti et al. | 426/614 |
| 4,296,134 | 10/1981 | Boldt | 426/250 |
| 4,409,249 | 10/1983 | Forkner | 426/100 |
| 4,469,708 | 9/1984 | Rapp et al. | 426/103 |
| 4,822,628 | 4/1989 | Huc | 426/614 |

*Primary Examiner*—Jeanette Hunter
*Assistant Examiner*—Helen Pratt
*Attorney, Agent, or Firm*—E. Vassiliou

[57] ABSTRACT

Methods of preparing simulated eggs, preferably chloesterol-free, capable of having the yolk and liquid egg-white together but in separate phases, so that upon cooking, the simulated eggs look and behave like natural eggs. This is achieved by heating the simulated yolks, which contain a negative thermoreversible gel former, such as albumin, until a shell or crust is formed around each yolk, while the inside of the yolk remains still liquid. It may also be achieved by breading a frozen simulated yolk with special types of hydrocolloids. Also, yolks made according to the above methods.

12 Claims, No Drawings

METHODS OF MAKING SIMULATED RAW EGGS

This is a Continuation-in-part of application Ser. No. 7/750,116, filed on Aug. 26, 1991, which is a Continuation-in-part part of application Ser. No. 07/551,160, filed on Jul. 11, 1990, now U.S. Pat. No. 5,073,399 both of which are incorporated herein by reference.

Field of the invention

This invention relates to simulated eggs, and preferably to cholesterol free simulated eggs capable of having the yolk and liquid egg-white together but in separate phases, so that upon cooking, the simulated eggs look and behave like natural eggs. It also pertains to methods of making such products.

Background of the Invention

Although the egg represents an outstanding nutritional food, and a food that people enjoy eating, especially as part of the breakfast in the morning, the fact that it is one of the richest foods in cholesterol has forced an enormous number of people to avoid consuming eggs.

A large number of attempts have been made to answer this problem, but the solutions presented so far have been either totally or partially unacceptable.

This is because, up to the point of this invention, no practical and/or economically feasible solution has been found to incorporate a simulated and preferably a cholesterol-free egg yolk into egg-white and preserve them in separate phases, so that one can make for example a "sunny side up" or an "over easy" egg. Thus, the only economical but still highly compromised solution, which has been found commercially feasible thus far, has been the one according to which the egg yolk is removed and substituted usually by an equivalent amount of egg white, a yellow-orange food-colorant and small quantities of other adjuncts improving desired properties of the simulated egg. Since this type of a simulated egg has the consistency and appearance of mixed egg-whites with egg-yolks, it can only be used as "scrambled eggs", or omelette, or more generally in cooking recipes requiring mixed egg-yolks with egg-whites. This is a serious draw-back because it does not provide people with the option to have a cholesterol-free fried or poached egg having an egg-yolk in a separate phase from the white. An egg with the yolk in a separate phase from the white is highly desirable to a large number of people.

Such products are the subject of a number of U.S. Patents. Representative ones, among others, are U.S. Pat. Nos. 3,911,144, 3,987,212, 4,103,038, and 4,296,134.

A method of preparing an egg-yolk substitute and resulting products from its use is described in U.S. Pat. No. 3,864,500. The invention of this patent is directed mainly to the addition of the resulting egg-yolk in recipes of products such as cakes, cookies, and the like, so that shaping and preserving the yolk in liquid egg-white is not important. Thus, no mention or suggestion on how to shape and preserve a shaped egg-yolk in liquid egg white is made.

A number of attempts have also been made in creating products, wherein the egg-yolk is combined with the egg-white in different phases, with limited success. These references do not disclose, suggest, or imply any methods of providing an egg having a monolithic egg-yolk having a flowable inside portion, the egg-yolk being in a separate immiscible phase within liquid egg-white before cooking, which egg-yolk is surrounded
either by a solid shell formed by heat treatment of the yolk, which yolk contains a negative non-thermoreversible gel former,
or by a breading of a hydrocolloid characterized by gel-limiting dissolution in the egg-white at room temperature, and film forming behavior in the egg-white at cooking temperatures.

In contrast, the present invention provides such products and methods for making the same.

U.S. Pat. No. 3,510,315 (Hawley) describes a solid simulated prepared egg product, wherein a solid cooked egg-yolk is surrounded with a solid cooked egg-white.

U.S. Pat. No. 3,640,732 describes a simulated cooked egg approximating a boiled, poached or fried hen's egg.

U.S. Pat. No. 3,843,825 (Hawley) provides a product resembling a hard boiled egg cut in half, by appropriately molding and coagulating egg-white.

U.S Patent 4,046,922 (Burkwall) discloses a shelf-stable cooked, simulated egg comprising specified amounts of egg-solids, edible water absorbing hydrocolloid, a high protein binding agent, water, and either sugar, sugar equivalents, or mixtures thereof.

U.S. Pat. No. 3,941,892 (Glasser et al.) discloses an egg product made by molding a low cholesterol egg-yolk portion of critical formulation together with an egg-white portion, and subjecting the egg to freezing. In the preferred embodiment, the mold employed in forming the egg product is employed as the package.

U.S. Pat. No. 4,103,040 (Fioriti) discloses a wet egg-yolk which is combined with edible oil by high energy, high shear mixing, so that the cholesterol is extracted by the oil from the egg-yolk. At the same time the ratio of the polyunsaturated fats to the saturated fats increases. The yolk, after separation from the oil can become a constituent of various egg-products.

U.S. Pat. No. 4,409,249 (Forkner) describes a method according to which high energy agitation is applied to coagulated and uncoagulated egg-white portion to form a homogeneous, aerated egg white dispersion. The egg-white dispersion is then assembled with processed egg-yolk and the assembly is frozen.

The instant invention, in contrast with the previous approaches, provides novel ways of resolving this vexing problem.

Summary of the Invention

In the present state of art regarding simulated eggs, either cumbersome, inconvenient, and/or expensive approaches have been proposed to prepare and use eggs having yolks in a separate phase from the egg-white, or the idea has been abandoned, and products having mixed egg-yolks with egg-whites have been the only ones to be practically and economically feasible, so as to find their way to the marketplace.

As indicated by the references cited above, the methods having been used so far to keep the egg-yolk in a separate phase from the egg-white have either employed an "overkill" approach, such as permanently solidifying both the egg-yolk and the egg-white, or inadequate approaches, such as molding and freezing the egg-yolk and then freezing the total egg, after the white has been added. The eggs of the former category lack flexibility and appeal. They give the impression, as far as the consumer is concerned, of "leftovers" or eggs which have to be reheated. The eggs of the second category require extreme accuracy and dexterity in preparation for consumption, especially during thawing and cooking. For example, if they are allowed to thaw completely, the egg-yolk will start being mixed spontaneously with the egg-white, since they will both be in the liquid state. Even if they do not mix excessively, the yolks will spread or even be divided into more than one globules during handling and/or transferring them from the package to the cooking pot or pan. Even in the case of Forkner's Patent (U.S. Pat. No. 4,409,249), in which case the egg-yolk is more securely contained by an optional membrane around the yolk and the egg-white which is gelling during thawing, the spontaneously produced gel structure of the egg-white does not allow the egg to be poured from the package to the pan and fried, for example, as a regular egg.

It has now been discovered by the applicant that a simulated egg may be made to give an excellent impression and resemblance to a real egg in both image and behavior if a number of requirements set forth by the applicant are met.

The instant invention is thus directed to a simulated egg, as well as methods for making and/or packaging the same.

According to this invention, a simulated egg is provided, wherein the egg-yolk and the liquid egg-white may coexist in the same container in separate phases without one dissolving in the other. When cooked, preferably fried or poached, the egg of this invention may be made to controllably look and taste like a real egg in any number of forms, such as "sunny side up", "over easy", "over medium", "over hard", and the like. It may also take the form of a novelty item as far as the shape and color of the yolk are concerned. The egg of the present invention may be frozen and then thawed, and stay thawed for long periods of time without the egg-yolk been mixed into the liquid egg-white. Of course, it may then be cooked and consumed, as long as spoilage has not occurred.

More particularly, the present invention pertains to a method of making a simulated egg comprising the steps of:

(a) mixing a colored edible liquid with a negative non-thermoreversible gel former;

(b) shaping the product of step (a) into individual monolithic portions;

(c) heating the portions of step (b) until a solid shell is formed around each of said portions, while the inside of each portion remains liquid; and (d) adding each portion of step (c) into liquid egg-white.

Preferably, one or more of the following conditions or any combination thereof may be also utilized:

the negative non-thermoreversible gel former comprises albumin, and more preferably egg albumin;

the method comprises a step of freezing the portions of step (c);

the method further comprises a step of forming a restrictive barrier around the portions of step (c), which barrier preferably comprises a hydrocolloid characterized by gel-limiting dissolution in the egg-white at room temperature, and film forming behavior in the egg-white at cooking temperatures;

the shaping of step (b) is conducted by molding; and the method further comprises a step of freezing the product of step (d).

In a more preferred embodiment, the present invention pertains to a method of making a simulated egg comprising the steps of:

(a) mixing a colored edible liquid with egg-albumin;

(b) shaping the product of step (a) into individual monolithic portions by casting said product into a mold;

(c) heating the portions of step (b) in the mold until a solid shell is formed around each of said portions, while the inside of each portion remains liquid;

(d) freezing the portions of step (c) while they are still in the mold;

(e) removing the portions of step (d) from the mold; and (f) adding each portion of step (e) into liquid egg-white.

Preferably, this method further comprises a step of forming a restrictive barrier around the portions of step (e), which restrictive barrier more preferably comprises a hydrocolloid characterized by gel-limiting dissolution in the egg-white at room temperature, and film forming behavior in the egg-white at cooking temperatures. Also preferably, this method further comprises a step of freezing the product of step In a still different embodiment, this invention pertains to a method of making a simulated egg comprising the steps of:

(a) shaping a colored edible liquid into individual monolithic portions by casting said liquid into a mold;

(b) freezing the portions of step (a) while they are still in the mold;

(c) removing the portions of step (b) from the mold;

(d) breading the portions of step (c) with a restrictive barrier comprising a hydrocolloid characterized by gel-limiting dissolution in the egg-white at room temperature, and film forming behavior in the egg-white at cooking temperatures; and (e) adding each portion of step (d) into liquid egg-white.

Other embodiments of this invention pertain to simulated eggs made according to the methods and/or their variations as described above.

Detailed Description of the Invention

It has been discovered by the applicant that a simulated egg may be made to give an excellent resemblance to a real egg in both image and behavior including texture and mouthfeel, if a number of requirements set forth by the applicant are met.

The instant invention is thus directed to methods for making simulated eggs, as well as simulated eggs made according to these methods.

When cooked, preferably fried or poached, the egg of this invention looks and behaves for all practical purposes like a real egg. The egg-yolk is structured in a way to be controllably flowable at serving temperatures, while it remains as a shaped monolithic separate phase within the egg-white at storage and handling temperatures before cooking. Room temperature is a temperature of about 20° to 25° C., while cooking temperatures are the temperatures over the temperature at which the egg-white coagulates. The egg-white may start coagulating in the vicinity of about 60° C. (139°-140° F.), depending on its exact composition. Serving temperatures range between cooking and room temperatures.

The egg-yolk in preferred embodiments of this invention has preferably the shape of a disk and a yellow (real egg-yolk like) color. However, it may also take the form of a novelty item as far as the shape, color, or taste of the yolk are concerned, as it will be explained in more detail later. The egg of the present invention may be frozen and then thawed, and stay thawed for long periods of time without the egg-yolk been mixed into the egg-white. Of course, it may then be cooked and consumed, as long as spoilage has not occurred.

Any type of egg-white, whether natural or simulated may be used for the purposes of this invention. However, a modified egg-white, in which Xanthan gum and/or Guar gum have been added to impart freeze thaw stability is highly preferred. The stabilized egg-white may be made in a similar way as the egg product described in U.S. Pat. No. 3,911,144, which is incorporated herein by reference, is made. The egg-yolk is simulated as defined below, thus rendering the whole egg itself simulated. In the context of this invention, a simulated egg-yolk is an egg-yolk which is not fully natural. Even though the preferable egg-yolks of this invention contain low or no cholesterol, the cholesterol content does not present limits to this invention.

In the preferred embodiments of this invention, the amount of calories provided by the yolk is minimal.

An important feature of this invention is that it provides a simulated egg, wherein the egg-yolk and liquid egg-white may coexist in the same container in separate phases without one substantially affecting or dissolving in the other.

Another important feature of this invention is that it provides an egg-yolk which may stay within liquid egg-white in a monolithic form without substantially loosing its monolithic structure, and which becomes controllably flowable upon cooking. By using the word "monolithic", it is meant that the egg-yolk is shaped in a separate phase without substantially mixing with the white, unless of course it is forced to do so by excessively forceful mixing, at least at temperatures not exceeding room temperature. Although "monolithic" usually refers to a single entity, in this discussion it is used mainly to stress individuality, and the fact that the egg-yolk does not mix with the egg-white. Thus, if desired, one may use more than one egg-yolks within a single package of egg-white, since configurations having a multiplicity of egg-yolks in the egg-white are still considered to have monolithic egg-yolks; the word "monolithic" refers to each individual egg-yolk, and not to the whole egg package. In addition to been monolithic, it is highly preferable for the egg-yolk of this invention to also be homogeneous. By the word "homogeneous" is meant that the egg-yolk will not contain large distinguishable pieces in different phases, and that it will look and feel uniform to approximate a real egg-yolk. Of course, this definition does not include a skin or other type of layer around the egg-yolk, which may be present, and which is desirable mainly in helping to prevent spreading of the egg-yolk during storage and cooking.

The shape of the egg-yolk does not have to be rigid, and it may be flexible as long as no substantial mixing between the egg-yolk and the egg-white occurs. A rounded disc shape is preferred, but other shapes may be desirable as discussed later.

As with the requirement of immiscibility, the requirement of monolithicity, as well as any other requirement, should be taken in view of the final intended use, and therefore it should be met during the period of the intended end-use. Nevertheless, regardless of final end-use, it is preferable that the simulated eggs of the present invention perform satisfactorily after being maintained for at least one day at room temperature, more preferably three days in the refrigerator, and even more preferably 7 days in the refrigerator. It is also preferable that the simulated eggs of this invention may withstand freezing temperatures for extended periods of time in order to be preserved in a frozen state accordingly.

It is important to the preferred embodiments of this invention that the yolk may be suspended within and supported by the liquid egg-white, without strong external (not being part of the yolk) containment, such as for example, gelled environment like gelled egg-white, and the like. This may be obtained by composing and structuring the yolk in a way to be adequately non-flowable as a whole entity, so that it does not subdivide into smaller portions, does not run, and in general does not mix with the liquid egg-white upon normal handling and storing of the egg. An unmodified real egg-yolk, for example, in case it were to loose the skin which contains it, it would spread and run within the egg-white and would loose its monolithic status.

Temperatures not exceeding room temperature are the normal temperatures at which an egg is being handled and stored before cooking.

It should be noted that a person of ordinary skill in the art may vary the parameters provided by this invention and receive the desired results without undue experimentation.

As already mentioned, a preferred method of making a simulated egg of the present invention comprises a step of mixing a colored edible liquid with a negative non-thermoreversible gel former. The edible liquid is preferably aqueous, with the option of having different ingredients dissolved, emulsified, or dispersed therein. Examples of edible liquids are water and milk, among many others. The colorant used to color the edible liquid, if it has a yellowish cast, is necessary to make the simulated egg-yolk resemble a real one, and in general, when it has any color at all except white, to make the yolk visibly distinguishable from the egg-white. Thus, it may have a yellow color, or any other color for special effects.

In the case of the negative non-thermoreversible gel former, the word "negative" means that the gel former forms a gel or sets by going from a lower to a higher temperatures. The negative gel formers in general may be subdivided into thermoreversible ones and non-thermoreversible or thermosetting ones. In the case of thermoreversible gel formers, the effect of gelation is reversible and the gel liquifies when the temperature assumes its initial value again. In contrast, in the case of the non-thermoreversible gel former, the effect of gelation is not reversible and the gel does not reliquidify, when the temperature assumes its initial value. Both types have good utility, depending on the results one would like to achieve.

According to the same preferred method, the yolk composition containing the colored edible liquid and the negative non-thermoreversible gel former, is shaped into individual monolithic portions, by being cast for example into mold cavities. The monolithic portions of the egg-yolk are then heated until a solid shell is formed around each of said portions, while the inside of each portion remains still liquid. The negative non-thermoreversible gel former is important, since it is needed to form upon heating the permanent solid shell. The liquid part of the yolk is thus protected and it is not allowed to mix with the egg-white, when the egg-yolk is added to egg-white at a later stage, and when the final egg is handled, and stored.

A good example of non-reversible negative gel formers is that of thermoset proteins, such as for example egg albumin. In this manner, amounts of egg-white solids (albumin) as low as 2-3%, or sometimes even lower, are adequate to produce permanent thermo-gelling to the egg-yolk of the present invention. For purposes of this invention, a negative non-thermoreversible gel former, such as egg albumin for example, is preferably used in an amount in the range of 2% to 14% by weight, and even more preferably in the range of to 10% by weight. As aforementioned, in making the yolks of the present invention, the heat is applied for only a short period of time, so that only an outside layer of the yolk is permanently thermogelled forming a shell, while the rest of the inside portion remains flowable or liquid, including paste-like consistencies. It is important to realize that if the egg-yolk contains a positive thermoreversible gel former, the flowable or liquid inside portion may attain the form of a gel when the egg-yolk is brought to room temperature or lower, as it will be explained better hereinbelow.

It is helpful to apply the shell-forming heat for the lowest possible time at the highest possible temperature without degrading, however, the yolk from excessively high temperature. This is because when the heat is applied on the outside of the yolk for a short time, and the temperature is adequately high, a thinner and stronger shell is formed without the heat having time to affect the inside liquid. For as long as the temperature of the inside remains under 60° C., or sometimes even somewhat higher, no coagulation (thermogelling) occurs. In order to keep the temperature of the inside low during the formation of the shell by application of heat from the outside, the temperature of the monolithic portions may be lowered, even to the point of freezing these portions. In addition, the composition may be cast into effectively hot molds, or other shaping devices.

For easier handling, especially when the shell is thin and/or the viscosity of the inside low, it is preferable to solidify the yolk temporarily by freezing it, so that it may be removed easily from the shaping device, such as a mold for example. Also, lubricating the mold, by greasing it, by using non-stick coatings, and the like, is helpful in this operation.

In order to further increase the ability of the yolk to remain in a monolithic configuration in the egg-white during handling, storing and cooking, and additional restrictive barrier may be used around the yolk.

A restrictive barrier, for example in the form of a skin, a membrane, a coating, or the like around the egg-yolk, may prevent spreading of the yolk during frying, and running of the yolk during its transfer to a serving dish. An example of a restrictive barrier may be a cross-linked film of an edible resin, such as for example an alginate, a pectin, and the like. A multivalent cation, such as for example calcium or aluminum may be used as the cross-linking agent in the form of a salt. This film may be applied to the yolk by well known to the art techniques rather easily, especially due to the shell formed around each portion of the egg-yolk of the instant invention, which even after freezing serves as a barrier to defrosted liquids, which may be produced and have highly adverse effects in the reproducibility and operability latitude of the application, if the temperature of the resin solution is higher than the melting point of the frozen yolk.

The cross-linked film should be strong, continuous, elastic, and thin in order to perform satisfactorily, both structurally and from the consumption point of view. A barrier made according to this general concept may be desirable, since it certainly reduces both the incidence and the degree of spreading and running. However, if it develops even small defects, such as pinholes and the like, or if it ruptures for any reason, which may be realized very easily, especially when the egg is subjected to freezing for storage, in which case there is a high potential of formation of needle-like ice crystallites combined with potential for syneresis and different other ill-effects of the freeze-thaw process, then the effectiveness of the restrictive barrier diminishes considerably in the absence of the shell discussed above.

It has been discovered by the applicant that a different type of a restrictive barrier is unexpectedly highly effective, and it lacks the drawbacks of the barrier just discussed above. Thus, it is a preferable type of restrictive barrier to be used in the preferred embodiments of the present invention.

This type of restrictive barrier may be formed by those hydrateable edible polymeric powdered compounds, or hydrocolloids, which give rise to substantially instantaneous increase in viscosity as soon as they come in contact with and start dissolving in aqueous systems. This enormous increase in viscosity forms a gel-like wall, which resists further dissolution of the compound, and thus it provides a self limiting dissolution behavior. Thus, it was found by the applicant that if such a compound is used to dust or "bread" the yolk of this invention after it has been shaped, and then the breaded yolk is added in the egg-white, an outstanding restrictive barrier is formed. The yolk may be immersed in water or other solution before the breading step, in order to form a liquid layer for wetting the particles of the breading compound. This, however, is not necessary, and it is actually preferable that the moisture provided by the yolk itself is used for this purpose, as it has been found to be not only adequate, but also optimal, since a thin adherent and dry-to-the-touch coating is formed providing the yolk with excellent handling characteristics, since all stickiness is eliminated, and thus even fragile yolk structures may be handled considerably more easily. This coating is also adequate to provide excellent restrictive barrier properties. The amount of the compound adhered to the yolk by the breading process lacking additional wetting, is preferably of the order 0.05 to 0.5, and more preferably of the order of 0.1 to 0.3 grams per disc shaped yolk having a diameter of about 4 cm and a thickness of about 1 cm, or a commensurate amount for yolks having a different volume to surface ratio. When the breaded yolk is added to the white, further hydration occurs and a gel-coating is formed around the yolk. It seems that the gel-like coating, due to its solubility, which although limited it still has a finite value, swells and forms a rather thick gel structure around the yolk and within the egg-white at storing temperatures. Even if this gel structure is somehow punctured, it tends to repair itself because of the finite solubility and gel forming characteristics of the slowly extending barrier. This is a very beneficial behavior for maintaining the integrity of the yolk. During cooking, the gel forms a film or skin, due to water evaporation or other mechanisms. In addition, spontaneous incorporation of egg-white within the outer part of this gel-like barrier provides a thicker, more integral and stronger skin to contain the yolk during cooking and transfer, which still has an excellent mouthfeel. Also, the inner part of the barrier close to the yolk remains denser while the outside part within the egg-white is more dilute, thus providing a more real-looking and better defined skin to protect the yolk during cooking and transfer. Thus, in general, puncturing by crystallites during freezing and thawing or other adverse conditions are of considerably reduced consequence to this novel type of barrier.

Examples of such compounds which form gels of the preferred type as discussed above are locust bean gums, carrageenan gums, carboxymethylcellulose, methyl cellulose, methyl/hydroxypropyl cellulose, xanthan gum, and the like, among others.

Finally the egg-yolk made as described above is added to egg-white to form a simulated egg.

The viscosity of the egg-yolk may be modified to attain any desired viscosity at serving temperatures by the addition in the egg-yolk composition of a viscosity builder, such as for example a starch, or a gum, or a number of other natural or artificial ingredients, preferably in a polymeric configuration.

From the starches, the ones appropriately modified to contribute to better freeze/thaw stability are preferable in this respect. Of course, mixtures of different types of starches may be utilized to attain the desired results within the property modification characteristics of said starches. In general, any type of starch may be used in the practice of this invention. The amount and type will depend on the effect to be achieved. Examples of starches are amioca, arrowroot, corn, high amylose, pea, potato, rice, sago, tapioca, waxy maize, wheat, thin-boiling or fluidity starches, oxidized starches, British gums, dextrins, and in general modified starches. A brochure "Staley Food Starches" from A.E. Staley Manufacturing Co., Longhorn, PA 19047, provides a representative list of different types of available starches providing different desired sets of properties. Selection of a particular starch from this or other lists of other manufacturers in order to achieve a certain result may be easily carried out by a person of ordinary skill in the art, without undue experimentation.

Examples of gums, which may be used in the practice of this invention are natural gums, seaweed extracts, as well as semi-synthetic gums, such as carboxymethylcellulose and methylcellulose derivatives. More specific examples include locust bean, xanthan, carob, guar, carrageenan, agar-agar, arabic, algin and alginates in general, as well as less common gums, such as ghatti, karaya, tragacanth, Australian, Cape, carmania, gedda, mesquite, mogadore, Persian, shiraz, talha, amrad, angico, apricot, brea, cashew, cebil, cedar, chagual, cherry, damson,jeol, mango, plum, sassa, and mixtures thereof. At any rate, the quality and quantity of a specific gum used in the formulation has to be such that it does not impart undesirable properties, including improper flavor, taste, and the like.

Many times, oils added to the composition along with the gums, tend to reduce the viscosity.

In contrast to the non-thermoreversible negative gel formers, the thermoreversible ones may provide the egg-yolk with a raised viscosity or even a gel structure at cooking temperatures, in a way that the egg-yolk becomes more rigid and it does not run or spread at such temperatures, while it regains the desired viscosity to be controllably flowable at consumption or serving temperatures. Methyl and methyl hydroxypropyl cellulose are of preference as thermoreversible negative gel formers. Usually, the viscosity of the egg-yolk decreases as the temperature increases in the absence of a proper modification, such as the addition of a negative thermoreversible gel former, for example. An appropriate amount, preferably between 0.1 and 10%, and more preferably between 0.2 and 2%, should be used to achieve the desired result, since an excessive amount extends the high viscosity to the serving range of temperatures, and an inadequate amount is ineffective. When a positive and a negative gel former are used in the same composition, special care should be taken to select the gel points and amounts of the coexisting gel formers such as to avoid undesired results. For example, as higher amounts of such combinations of gel formers are used, and their gel points are closer, or even more so when their gel points start overlapping, the temperature range in the available consumption or serving temperature region for easily flowable egg-yolks, such as "sunny side up", and "over easy" becomes narrower, or it is even eliminated completely. However, observing simple precautions as the above, it becomes a minimal task to any person with ordinary skill in the art to select appropriate gel points and appropriate amounts of negative and positive gel formers for achieving a desired result.

The use of certain water-soluble hydrocolloid compounds to form a barrier, especially with self-repairing properties, in a water-based system, such as the egg-white, without any cross-linking or other permanently insolubilizing mechanism is admittedly a highly unexpected phenomenon. Thus, in a less preferred embodiment of this invention, this property may be used to contain even liquid egg-yolks, without formation of a shell. These yolks may be made by simply shaping and freezing a composition comprising a colored edible liquid, breading the frozen composition with a hydrocolloid as discussed above, and adding it in egg-white.

Preferably the composition also comprises a negative non-thermoreversible gel former, such as egg albumin for example, preferably in an amount in the range of 2% to 14% by weight, and even more preferably in the range of 4% to 10% by weight.

Any explanations given above are only speculative, and must not be construed as restricting in any way the scope of this invention. It is only of importance that this type of barrier configuration gives highly improved performance as compared to conventional methods.

Milk, preferably of the low-fat type, and more preferably of the non-fat type may be used as an additional ingredient in the composition of the yolks of the present invention. It provides flavor, texture, some opacity, and it may decrease syneresis or water separation. It is also an additional source of protein. The preferred range of milk solids by weight in the total egg-yolk composition is between 1% and 20%, more preferably 5% to 15%.

Miscellaneous other ingredients, such as vitamins, minerals, stabilizers, antioxidants, opacifiers, and the like, well recognized and utilized in the art of food products may also be used to impart the respective desirable functions. These may for example include such compounds as aluminum sulfate, ferric orthophosphate, thiamine mononitrate, riboflavin, vitamin D2, and the like.

A positive thermoreversible gel former may also be used in any of the compositions of the present invention as described above. By "positive" it is meant that the gel configuration or status is assumed upon decreasing the temperature. The positive thermoreversible gel formers may go from a more flowable status to a gel status and back to the more flowable status repeatedly. A good example of a preferred positive reversible gel former is gelatin. Gelatin solutions have a gel point in the vicinity of room temperature (20°–25° C.), and they have the advantage of being in the flowable configuration at human body temperatures. Other examples are carrageenan gums, and a large number of proprietary formulations sold by vendors in the food industry.

Pasteurization of the simulated eggs of the instant invention should be conducted to meet Government specifications regarding microbe content. Salmonella bacteria are of great concern. It is preferable that the egg-whites are pasteurized separately, and that the egg-yolks are pasteurized before they have been shaped. Pasteurization techniques are given in the "Encyclopedia Of Chemical Technology", Kirk Othmer, John Wiley & Sons, Vol. 8, pp. 429–445, the text of which is incorporated herein by reference.

The preferred egg-yolk of this invention is in the form of a disc. However, any other shape, including the spherical shape of a real yolk, lies within the scope of this invention. The disc-like shapes are preferable, because upon cooking such as frying for example, it is easier to avoid spreading and running of an egg-yolk having a flattened shape, such as the shape of a disc. The dimensions of the disc are also important. I general, the thicker the disc the higher the potential of the yolk to spread during frying. Unless a special effect is desired regarding the dimensions and generally the appearance of the simulated egg-yolk, the following hold valid.

The ratio of the diameter to the thickness should preferably be larger than 1, more preferably 2–6, and even more preferably 3–4. If the ratio is less than 1, the disc may be considered to be a cylinder rather than a disc, and when cooked it is very likely that it will fall on its side. The diameter of the disc should preferably be 20–70 mm, more preferably 25–55 mm, and even more preferably 30–45 mm. A diameter smaller than 20 mm provides an unrealistically small looking yolk, while a diameter larger than 70 mm renders the egg-yolk unrealistically large-looking. The thickness should preferably be 4–20 mm, more preferably 5–15 mm, and even more preferably 10–15 mm. Yolks thinner than 4 mm look unrealistically small, while thicker than 20 mm are more difficult to warm adequately, especially their central part in order to achieve the desirable and uniform flowability during frying, they have higher potential of spreading during cooking, as well as they are easier to run during being transferred from the pan to a serving dish.

Special effects may be achieved by using other shapes than discs. Examples are heart-like shapes, butterfly-like shapes, face-profile shapes, and any other type of preferably flat shapes. Of course, these may be combined with different colors to enhance the effect, if so desired. A good example may be that of an egg according to this invention, with a heart-shaped cholesterol-free yolk to symbolize the advantage of the simulated egg in saving the heart of the person who consumes such an egg.

Depending on the ingredients selected for a given desirable behavior of the egg-yolk of this invention, a suitable method should be used to ensure harmonious incorporation of said ingredients into the composition. Any person with ordinary skill in the art may easily decide on a proper sequence of addition, as well as conditions of the process in order to achieve good mixing and incorporation of the ingredients into the composition without undesirable effects. Very helpful to this task are different brochures from the vendors, which provide information relative to the behavior of the ingredients.

A person of ordinary skill in the art may be based on the teachings disclosed in the specification of the present invention and make simulated egg-yolks having desired attributes, depending on the particular application.

The simulated eggs made according the methods of this invention may be cooked in any style natural eggs are cooked. Frying and poaching are the preferred methods. The simulated eggs of the present invention, when they contain a negative non-reversible gel former, such as albumin for example, may be cooked just enough to have liquid yolks, or more to obtain solidified or coagulated yolks.

GLOSSARY

EGG-WHITE POWDER

Egg Albumin, Lot 25342, from Penta Manufacturing, East Hanover, N.J. 07936

FREEZIST M Starch modified tapioca starch from A.E. Staley Manufacturing Co., Decatur, Ill. 62525.

LOCUST BEAN GUM FL 50-50 from AQUALON, 2711 Centerville Rd., P.O. Box 15417, Wilmington, Del. 19850-5417.

McCORMICK Red Food Color

A water solution containing propylene glycol, FD&C red #40, FD&C #3 and 0.1% propylparaben (20 drops of solution correspond to about 0.67 gram), sold in supermarkets as "Yellow Food Color", from McCormick & Co., Inc., P.O. Box 208, Hunt Valley, Md. 21030

McCORMICK Yellow Food Color

A water solution containing propylene glycol, FD&C Yellow #5, FD&C red #40, and 0.1% propylparaben (20 drops of solution correspond to about 0.67 gram), sold in supermarkets as "Yellow Food Color", from McCormick & Co., Inc., P.O. Box 208, Hunt Valley, Md. 21030

Natural Flavor compound (taste of egg)

R-7799/261745 from Haamann and Reimer Corp., Springfield, N.J. 07081

METHOD OF FRYING THE EGGS

During this work, unless otherwise stated, the eggs are added to the fry pan containing hot oil (medium or high setting of the electric heating element). The temperature is maintained this way at such level as to prevent splashing of oil around the pan. Oil is taken from the side of the egg with a spoon and is poured on top of the yolk and the rest of the central areas of the egg, which are necessarily cooler than the edges. The eggs are not turned over unless otherwise stated.

GENERAL COMMENTS

All quantities and percentages are given by weight, unless otherwise stated.

20 drops of McCORMICK Yellow or Red Food Color correspond to 0.67 gram.

Examples demonstrating the operation of the instant invention have been given for illustration purposes only, and should not be construed as restricting the scope or limits of this invention in any way. In addition, it should be stressed that the preferred embodiments discussed in detail hereinabove, as well as any other embodiments encompassed within the limits of the instant invention, may be practiced individually or in any combination thereof, according to common sense and/or expert opinion. These combinations also lie within the realm of this invention. Furthermore, any attempted explanations in the discussion are only speculative and are not intended to limit the limits of this invention.

EXAMPLE 1

The following ingredients were mixed as follows:

The flavor, the starch and the milk powder were mixed together, followed by the addition of the water and the colorant with good stirring.

In a separate container, the egg-white powder and 25 grams of water were mixed with a spoon, until a uniform mixture was received. The rest of the water was then added and mixed in, producing a solution of egg-white.

The first mixture was heated until the starch was hydrated and the viscosity was raised to what seemed to be a constant level of rather high viscosity. The temperature of this mixture was brought then to 50°-60° C., and the solution of the egg-white was added under stirring, resulting in considerable reduction of the viscosity.

| | |
|---|---|
| Natural Flavor compound | 0.2 grams |
| FREEZIST M Starch | 24 grams |
| Non fat milk powder | 20 grams |
| Water | 110 grams |
| McCormick red food color | 20 drops |
| McCormick red food color | 1 drop |
| Egg-white powder | 20 grams |
| Water | 25 grams |
| Water | 85 grams |

A muffin tin was used to cast yolks of the above mixture. Its cavities, being of the usual trapezoidal cross-section, had a bottom with a diameter of 1¼", an upper opening of 1⅞", and a height (distance between the bottom and the upper opening) of ¾". The muffin tin was sprayed with Mazola ® "No-Stick" corn oil cooking spray before casting the yolks. The thickness of the yolks was about ¼" to ⅜".

EXAMPLE 2

The muffin tin with yolks of the above mixture in some of its cavities was put in the freezer until the liquid yolks were frozen solid completely. One of the yolks was removed from the respective cavity and put in a small container having liquid egg-white. It was allowed to thaw at room temperature for about 2 hours. No mixing with the white was observed at this point. However, when the container was manipulated in a circular motion, forcing the yolk to swirl within the white, the disk-like shape of the yolk was completely destroyed, assuming the configuration of the swirl direction, and being mixed with the white. This represents an unacceptable situation.

EXAMPLE 3

The muffin tin with yolks of the same mixture in some of its cavities was put in the freezer until the liquid yolks were frozen solid completely. One of the yolks was removed from the respective cavity and it was breaded with Locust Bean Gum. Then, it was put in a small container having liquid egg-white. It was allowed to thaw at room temperature for about 2 hours. No mixing with the white was observed. Also, when the container was manipulated in a circular motion, forcing the yolk to swirl within the white, the disk-like shape of the yolk remained intact. The egg was then fried in oil. Although the yolk did not run, it exhibited, considerable flattening. It was fried for just enough time to leave the inside of the yolk still liquid. Another yolk was fried to the point that the inside solidified also.

EXAMPLE 4

The muffin tin with yolks of the same mixture in some of its cavities was put in a toaster/oven for just enough time to form a solid crust or shell around them, but still to remain liquid inside. One of the yolks was removed from the respective cavity and it was put in a small container having liquid egg-white. It was allowed to remain at room temperature for about 2 hours. No mixing with the white was observed. Also, when the container was manipulated in a circular motion, forcing the yolk to swirl within the white, the disk-like shape of the yolk remained intact. The egg was then fried in oil. The yolk did not run and it did not exhibit any flattening. It was fried for just enough time to leave the inside of the yolk still liquid. Another yolk was fried to the point that the inside solidified (coagulated) also.

EXAMPLE 5

The muffin tin with yolks of the same mixture in some of its cavities was put in a toaster/oven for just enough time to form a solid crust or shell around them, but still to remain liquid inside. The muffin tin was then put in the freezer until the yolks were frozen solid completely. One of the yolks was removed from the respective cavity and it was put in a small container having liquid egg-white. It was allowed to thaw at room temperature for about 2 hours. No mixing with the white was observed. Also, when the container was manipulated in a circular motion, forcing the yolk to swirl within the white, the disk-like shape of the yolk remained intact. The egg was then fried in oil. The yolk did not run and it did not exhibit any flattening. It was fried for just enough time to leave the inside of the yolk still liquid. Another yolk was fried to the point that the inside solidified (coagulated) also. Removing the yolk after freezing was much easier than removing it from the cavity as shown in the method of Example 4.

EXAMPLE 6

The muffin tin with yolks of the same mixture in some of its cavities was put in a toaster/oven for just enough time to form a solid crust or shell around them, but still to remain liquid inside. One of the yolks was removed from the respective cavity, it was breaded with Locust Bean Gum, and it was put in a small container having liquid egg-white. It was allowed to remain at room temperature for about 2 hours. No mixing with the white was observed. Also, when the container was manipulated in a circular motion, forcing the yolk to swirl within the white, the disk-like shape of the yolk remained intact. The egg was then fried in oil. The yolk did not run and it did not exhibit any flattening. It was fried for just enough time to leave the inside of the yolk still liquid. Another yolk was fried to the point that the inside solidified (coagulated) also. The Locust Bean Gum breading gave additional protection to the liquid inside of the yolk.

EXAMPLE 7

The muffin tin with yolks of the same mixture cast in some of its cavities was put in a toaster/oven for just enough time to form a solid crust or shell around them, but still to remain liquid inside. The muffin tin was then put in the freezer until the yolks were frozen solid completely. One of the yolks was removed from the respective cavity, it was breaded with Locust Bean Gum, and it was put in a small container having liquid egg-white. It was allowed to thaw at room temperature for about 2 hours. No mixing with the white was observed. Also, when the container was manipulated in a circular motion, forcing the yolk to swirl within the white, the disk-like shape of the yolk remained intact. The egg was then fried in oil. The yolk did not run and it did not exhibit any flattening. It was fried for just enough time to leave the inside of the yolk still liquid. Another yolk was fried to the point that the inside solidified (coagulated) also. Breading after freezing was much easier than breading the delicate yolk just after forming the crust or shell in the case of Example 6.

COMMENTS

From the above experiments, the most preferable method of making simulated yolks, regarding the final containment of the liquid inside part of the yolk, is that of Example 7, followed by that of Example 5, and that of Example 3, in that order. Of course, the method of Example 6 and the method of Example 4 are variations of the methods of Example 7 and the method of Example 5, respectively, where the step of freezing the yolk before adding it to the white is omitted. This results in the need for more careful handling of the yolks, which are considerably more delicate at this stage as compared to the frozen stage. The method described in Example 2 is unacceptable.

EXAMPLES 8 to 14

The same set of experiments, with the difference that the eggs (the containers having the egg-white with the yolk added) in each case were frozen, thawed, and otherwise treated the same way as the eggs of the set described above. The results were similar, and the same order of preference remained.

What is claimed is:

1. A method of making a simulated egg comprising the steps of:
   (a) mixing a colored edible liquid with a negative non-thermoreversible gel former;
   (b) shaping the product of step (a) into individual monolithic portions;
   (c) heating the portions of step (b) until a solid shell is formed around each of said portions, while the inside of each portion remains liquid; and
   (d) adding each portion of step (c) into liquid egg-white.

2. A method as defined in claim 1, wherein the negative non-thermoreversible gel former is albumin.

3. A method as defined in claim 1, further comprising a step of freezing the portions of step (c).

4. A method as defined in claim 1, further comprising a step of forming a restrictive barrier around the portions of step (c).

5. A method as defined in claim 4, wherein the restrictive barrier comprises a hydrocolloid characterized by gel-limiting dissolution in the egg-white at room temperature, and film forming behavior in the egg-white at cooking temperatures.

6. A method as defined in claim 1, wherein the shaping of step (b) is conducted by molding.

7. A method as defined in claim 1, further comprising a step of freezing the product of step (d).

8. A method of making a simulated egg comprising the steps of:
   (a) mixing a colored edible liquid with egg-albumin;
   (b) shaping the product of step (a) into individual monolithic portions by casting said product into a mold;
   (c) heating the portions of step (b) in the mold until a solid shell is formed around each of said portions, while the inside of each portion remains liquid;
   (d) freezing the portions of step (c) while they are still in the mold;
   (e) removing the portions of step (d) from the mold; and
   (f) adding each portion of step (e) into liquid egg-white.

9. A method as defined in claim 8, further comprising a step of forming a restrictive barrier around the portions of step 10. A method as defined in claim 8, wherein the restrictive barrier comprises a hydrocolloid characterized by gel-limiting dissolution in the egg-white at room temperature, and film forming behavior in the egg-white at cooking temperatures.

11. A method as defined in claim 8, further comprising a step of freezing the product of step (f).

12. A method of making a simulated egg comprising the steps of:
    (a) shaping a colored edible liquid containing a negative non-thermoreversible gel former into individual monolithic portions byc asting said liquid into a mold;
    (b) freezing the portions of step (a) while they are still in the mold;
    (c) heating the portions of step (b) until a solid shell is formed around each of said portions, while the inside of each portion remains liquid;
    (d) removing the portions of step (c) from the mold;
    (e) breading the portions of step (d) with a restrictive barrier comprising a hydrocolloid characterized by gel-limiting dissolution in the egg-white at room temperature, and film forming behavior in the egg-white at cooking temperatures; and
    (f) adding each portion of step (e) into liquid egg-white.

* * * * *

UNITED STATES PATENT AND TRADEMARK OFFICE
CERTIFICATE OF CORRECTION

PATENT NO. : 5,149,561

DATED : September 22, 1992

INVENTOR(S) : Vassiliou

It is certified that error appears in the above-identified patent and that said Letters Patent is hereby corrected as shown below:

Column 7, line 12, "range of to 10%" should read --range of 4% to 10%--.

Signed and Sealed this

Twenty-eighth Day of September, 1993

Attest:

BRUCE LEHMAN

*Attesting Officer*     *Commissioner of Patents and Trademarks*